United States Patent
Wallen et al.

(10) Patent No.: US 8,885,560 B2
(45) Date of Patent: *Nov. 11, 2014

(54) CELLULAR COMMUNICATION SYSTEM SUPPORT FOR LIMITED BANDWIDTH COMMUNICATION DEVICES

(75) Inventors: Anders Wallen, Ystad (SE); Bengt Lindoff, Bjarred (SE); Erik Eriksson, Linkoping (SE); Joakim Axmon, Kavlinge (SE); Leif Wilhelmsson, Dalby (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 173 days.

This patent is subject to a terminal disclaimer.

(21) Appl. No.: 13/398,787

(22) Filed: Feb. 16, 2012

(65) Prior Publication Data
US 2012/0327895 A1    Dec. 27, 2012

Related U.S. Application Data

(60) Provisional application No. 61/501,547, filed on Jun. 27, 2011.

(51) Int. Cl.
*H04Q 7/00*    (2006.01)
*H04W 48/12*    (2009.01)
*H04L 5/00*    (2006.01)

(52) U.S. Cl.
CPC ............. *H04W 48/12* (2013.01); *H04L 5/0053* (2013.01); *H04L 5/0091* (2013.01); *H04L 5/0094* (2013.01)
USPC .......................................... 370/328; 370/329

(58) Field of Classification Search
CPC ..... H04W 72/04; H04W 88/08; H04W 76/00; H04W 80/04; H04W 84/12; H04W 88/06; H04W 48/12; H04L 5/0091; H04L 5/0094
USPC ........................... 370/341, 331, 338, 328–329
See application file for complete search history.

(56) References Cited

U.S. PATENT DOCUMENTS 8,254,299 B2 *    8/2012    Kim .............................. 370/312
(Continued)

FOREIGN PATENT DOCUMENTS

GB    2 358 327 A    7/2001
(Continued)

OTHER PUBLICATIONS

3GPP TS 36.201, V10.0.0 Technical Specification Group Radio Access Network; Evolved Universal Terrestrial Radio Access (E-UTRA); LTE physical layer; General Description (Release 10), Dec. 2010.

(Continued)

*Primary Examiner* — Chuong T Ho
(74) *Attorney, Agent, or Firm* — Leffler Intelllectual Property Law, PLLC; Kenneth B. Leffler

(57) ABSTRACT

A communication system node transmits first control channel information on a control channel that extends over a first bandwidth of a radiofrequency resource. The first control channel information is necessary to enable a first type of communication device, capable of receiving a signal having the first bandwidth, to establish a connection with a host cell. A MIB, occupying a second bandwidth-size part of the first bandwidth, is transmitted. The second bandwidth is smaller than the first bandwidth and is receivable by a second type of communication device having reduced receive bandwidth capabilities. The MIB has a first part comprising first part information necessary to enable the first type of communication device to establish the connection with the host cell, and a second part comprising second part information directly or indirectly enabling the second type of communication device to obtain parameters that enable connection establishment with the host cell.

32 Claims, 14 Drawing Sheets

(56) References Cited

U.S. PATENT DOCUMENTS

| | | | |
|---|---|---|---|
| 2008/0212546 | A1 | 9/2008 | Fischer |
| 2010/0165901 | A1* | 7/2010 | Kim ............................ 370/312 |
| 2010/0260081 | A1 | 10/2010 | Damnjanovic et al. |
| 2011/0149890 | A1* | 6/2011 | Chun et al. .................... 370/329 |
| 2011/0310854 | A1* | 12/2011 | Zou et al. ...................... 370/336 |
| 2013/0083753 | A1* | 4/2013 | Lee et al. ...................... 370/329 |
| 2014/0126508 | A1* | 5/2014 | Young et al. .................. 370/329 |
| 2014/0153516 | A1* | 6/2014 | Young et al. .................. 370/329 |

FOREIGN PATENT DOCUMENTS

| | | |
|---|---|---|
| GB | 2 428 537 A | 1/2007 |
| KR | 2010/0043483 A | 4/2010 |
| WO | 2010/049754 A1 | 5/2010 |
| WO | 2010/075819 A1 | 7/2010 |
| WO | 2012/104630 A1 | 8/2012 |

OTHER PUBLICATIONS

Chen et al. "Machine-to-Machine communication in LTE-A" VTC, Fall 2010, Sep. 6-9, 2010, pp. 1-4, ISSN: 1090-3038.

PCT Partial Search Report and Invitation to Pay Fees, dated Oct. 4, 2012, in connection with International Application No. PCT/EP2012/061969.

IPWireless Inc. "Proposal for a study item in support of low complexity LTE devices for MTC" 3GPP Draft R2-112974, 3GPP Mobile Competence Centre, 650 Route Des Lucioles, F-06921 Sophia-Antipolis Cedex, France, RAN WG2, Barcelona, Spain, Apr. 29, 2011, XP050494837.

PCT Search Report, mailed Oct. 25, 2012, in connection with counterpart International Application No. PCT/EP2012/061982.

PCT Written Opinion, mailed Oct. 25, 2012, in connection with counterpart International Application No. PCT/EP2012/061982.

PCT International Search Report, mailed Jan. 18, 2013, in connection with International Application No. PCT/EP2012/061969.

PCT Written Opinion, mailed Jan. 18, 2013, in connection with International Application No. PCT/EP2012/061969.

* cited by examiner

FIG. 1 (PriorArt)

CELLULAR COMMUNICATION SYSTEM SUPPORT FOR LIMITED BANDWIDTH COMMUNICATION DEVICES

CROSS REFERENCE TO RELATED APPLICATIONS

This application claims the benefit of U.S. Provisional Application No. 61/501,547, filed Jun. 27, 2011, which is hereby incorporated herein by reference in its entirety. This application is also related to U.S. application Ser. No. 13/398,786, filed on even date herewith, entitled "Cellular Communication System Support for Limited Bandwidth Communication Devices", and naming Joakim Axmon, Erik Eriksson, Bengt Lindoff, Anders Wallen, and Leif Wilhlelmsson as inventors, which is hereby incorporated herein by reference in its entirety.

BACKGROUND

The present invention relates to cellular communication systems, and more particularly to support for both full-bandwidth and limited-bandwidth devices in a cellular communication system.

Cellular communication systems typically comprise a land-based network that provides wireless coverage to mobile terminals that can continue to receive service while moving around within the network's coverage area. The term "cellular" derives from the fact that the entire coverage area is divided up into so-called "cells", each of which is typically served by a particular radio transceiver station (or equivalent) associated with the land-based network. Such transceiver stations are often referred to as "base stations". As the mobile device moves from one cell to another, the network hands over responsibility for serving the mobile device from the presently-serving cell to the "new" cell. In this way, the user of the mobile device experiences continuity of service without having to reestablish a connection to the network. FIG. 1 illustrates a cellular communication system providing a system coverage area 101 by means of a plurality of cells 103.

The radiofrequency spectrum that is utilized to provide mobile communication services is a limited resource that must be shared in some way among all of the users in a system. Therefore, a number of strategies have been developed to prevent one mobile device's use (both transmitting and receiving) of radio spectrum from interfering with that of another, as well as to prevent one cell's communications from interfering with those of another. Some strategies, such as Frequency Division Multiple Access (FDMA) involve allocating certain frequencies to one user to the exclusion of others. Other strategies, such as Time Division Multiple Access (TDMA) involve allowing multiple users to share one or more frequencies, with each user being granted exclusive use of the frequencies only at certain times that are unique to that user. FDMA and TDMA strategies are not mutually exclusive of one another, and many systems employ both strategies together, one example being the Global System for Mobile communication (GSM).

As designers strive to develop systems with higher and higher capabilities (e.g., higher communication speeds, resistance to interference, higher system capacity, etc.), different technical features are incorporated, including different means for sharing radiofrequency resources. To take one of a number of possible examples, the Evolved-Universal Terrestrial Radio Access Network (E-UTRAN) Long Term Evolution (LTE) technology, as defined by 3GPP TR 36.201, "Evolved Universal Terrestrial Radio Access (E-UTRA); Long Term Evolution (LTE) physical layer; General description" will be able to operate over a very wide span of operating bandwidths and also carrier frequencies. Furthermore, E-UTRAN systems will be capable of operating within a large range of distances, from microcells (i.e., cells served by low power base stations that cover a limited area, such as a shopping center or other building accessible to the public) up to macrocells having a range that extends up to 100 km. In order to handle the different radio conditions that may occur in the different applications, Orthogonal Frequency Division Multiple Access (OFDMA) technology is used in the downlink (i.e., the communications link from the base station to the User Equipment—"UE") because it is a radio access technology that can adapt very well to different propagation conditions. In OFDMA, the available data stream is portioned out into a number of narrowband subcarriers that are transmitted in parallel. Because each subcarrier is narrowband it only experiences flat-fading. This makes it very easy to demodulate each subcarrier at the receiver.

Cellular systems like Wideband Code Division Multiple Access (WCDMA) and LTE regularly transmit information directed at all communication devices within the cell; this information is referred to as "broadcast information." Such broadcast information is needed in order for the mobile terminal to be able to determine permission to camp on a cell as well as connection setup parameters. In both LTE and WCDMA the broadcast information is divided into a Master Information Block (MIB) and a System Information Block (SIB). The MIB includes the most important system information, such as frame timing. The MIB could also, as in WCDMA, give a pointer to time instances for when different SIBs are transmitted on the Primary Common Control Physical Channel (P-CCPCH). In LTE however, the SIB redundancy versions are always transmitted in a certain order, on the PDSCH in sub frame 5. In both WCDMA as well as LTE, the frequencies allocated to SIB transmission(s) are, in a sense, defined by standardization, so there is no provision for the MIB to include any such information. Information identifying the timing and frequencies to be used for SIB transmissions can be communicated in control channel information that is broadcast at a known time. The SIB then includes more cell specific information, such as information needed for the mobile terminal to be able to perform random access, via the Random Access Channel (RACH). Such RACH-related information could include, for example, which uplink time slots to use for RACH transmissions as well as RACH power parameters and RACH signatures to be used.

In systems such as WCDMA and LTE, the MIB is always transmitted at a certain time instant, and always occupies a standard-defined frequency allocation. Consequently, each mobile terminal is designed to know how to find the MIB. For instance, in LTE the MIB is transmitted in the central 6 resource blocks (RBs) in subframe 0, and consists of four parts, each of which can be individually recovered (provided that the received signal has a sufficiently good signal-to-noise ration (SNR)). The SIB redundancy versions are, as mentioned above always transmitted in subframe 5, in a specific order. However, the frequencies used could vary over the whole system bandwidth between different frames. The position used for the SIB redundancy versions are determined by decoding the Physical Downlink Control Channel (PDCCH), which points out which RBs of the Physical Downlink Shared Channel (PDSCH) are used for SIB transmission(s). The modulation and coding scheme (MCS) used for the SIBs are also signalled on the PDCCH.

It will be appreciated from the above that, in order to establish a connection with a cell, a standard-compliant communication device needs to be able to receive and decode the PDCCH. The PDCCH itself occupies the whole system bandwidth, which in turn forces current LTE (and similar) terminals to adapt its receiver bandwidth to match that of the system bandwidth in order to be able to receive the SIB, if any such information is transmitted to the UE or broadcasted to multiple UEs in the subframe (1 ms period). This raises issues and problems, as will now be described.

Machine type communication (MTC) over LTE is increasingly gaining attention as operators are planning for replacement of older communication systems, like GSM, by LTE networks. MTC devices, such as connected sensors, alarms, remote control devices and the like, are common in GSM networks where they co-exist with more conventional UEs (e.g., mobile phones). MTC devices are generally characterized by a modest bit rate and sparse communication activity. The number of MTC devices is expected to increase dramatically during the next few years.

In release 8/9 versions of LTE, the supported cell bandwidth is within the range of about 1.4 to 20 MHz (6 and 100 resource blocks (RBs) in LTE terminology). As mentioned above, LTE's PDCCH extends over the full cell bandwidth, which means that all UEs have to support reception over the full cell bandwidth in order to receive control information and thereby be able to establish a connection with the cell.

LTE Release 8 already supports time-domain multiplexing on a subframe basis between unicast and multicast signaling of subframes used for Multimedia Broadcast via Single Frequency Network (MBSFN) in order to allow MBSFN to be introduced in later releases without negatively impacting legacy terminals. Any terminal (UE) designed in accordance with earlier versions of LTE (a "legacy terminal") does not support MBSFN but does recognize that subframes signaled as being MBSFN subframes contain nothing for the terminal to receive, and hence reception can be avoided in those subframes. One exception is the first OFDM symbol in the subframe which carries cell-specific reference signals (CRS), which may be used by the terminal (e.g. for channel estimation or for measurements (e.g. Radio Link Monitoring—"RLM" or Reference Signal Received Power—"RSRP"), particularly when adjacent to normal subframes. MBSFN subframes are now being discussed for use not only for multicast operation, but in the context of relaying and improved measurements and improved performance in heterogeneous network deployment scenarios along with Almost Blank Subframes (ABS).

MTC devices utilizing a cellular system for communication have become increasingly popular. The notion of developing an MTC device that is capable of communicating by means of communication systems such as LTE presents problems, however, because meeting the existing LTE requirements would cause an MTC device to be more costly and to consume more power than it would ordinarily require to satisfy its own quality of service requirements. As mentioned above, an MTC device typically requires only a low data rate for signaling a small amount of data. One example of an MTC device category is sensory equipment. An important requirement of such devices is that they should have low cost as well as low power consumption. Examples of cellular system parameters that typically drive cost and power consumption are the system bandwidth as well as response time. Using LTE as defined according to current standardization releases requires that a device support a system bandwidth that is up to 20 MHz. Supporting such a large bandwidth would increase the cost for LTE MTC devices, and such support would essentially be unnecessary from the MTC device's point of view because only a small system bandwidth (e.g., up to some few MHz) is required to support the MTC device's relatively low data rate.

Furthermore, LTE has short response time requirements, in terms of a short amount of time for issuing a Hybrid Automatic Repeat Request (HARQ) response, as well as a short time interval between the control signaling (indicating that data information is forthcoming) and the actual transmission of the data information. (In LTE systems, the PDCCH points out data in the PDSCH that is included in the same subframe as the PDCCH). Satisfying these time requirements imposes high requirements on the processing speed (which drives power) and/or the need for parallel processing (increasing baseband chip area and thereby the cost). MTC devices supporting low data rates and with low power requirements optimally should use long response times (e.g., a longer time for decoding of control information and data) in order to reduce the required clocking speed or parallel processing requirements.

The points raised above show why it is beneficial to restrict MTC devices to operate at system bandwidths that are lower than 20 MHz. But it would be too restrictive to require that all cellular networks limit themselves to using only small bandwidths if they are support power and cost efficient MTC devices.

Presently, there is an incompatibility between MTC devices supporting only a low bandwidth and/or having insufficient decoding performance (e.g., requirements of a longer delay between the PDCCH and the possible data on the PDSCH) which prevents such devices from being able to connect to an LTE system as it is presently defined by the Third Generation Partnership Project (3GPP) standard. While such MTC devices would be able to perform a cell search and receive a Master Information Block (MIB) on just a 1.4 MHz bandwidth, camping on a conventional LTE cell would still not be possible because being able to receive the further broadcast information (e.g., a System Information Block—"SIB") that is required for the MTC device to be able to, for example, perform a random access via the Random Access Channel (RACH) requires that the MTC device be capable of supporting the full LTE bandwidth and also that the MTC device be able to decode the PDCCH and the PDSCH without any additional delay restrictions compared to the current standard.

It is therefore desirable to have methods and apparatuses that enable an MTC device to retain its relatively low performance characteristics (e.g., in terms of size of bandwidth supported and/or processing power) and yet be capable of connecting to a modern-day cellular communications system, such as but not limited to an LTE system, that ordinarily imposes higher performance requirements on connecting devices.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

In accordance with one aspect of the present invention, the foregoing and other objects are achieved in, for example, methods and apparatuses for operating a network node that serves a host cell in a cellular communication system. Such operation includes, at one or more first time intervals, transmitting first control channel information on a control channel that extends over a first bandwidth of a radiofrequency resource, wherein the first control channel communicates information that is necessary to enable a first type of communication device to establish a connection with the host cell. The first type of communication device is capable of receiving a signal having the first bandwidth of the radiofrequency resource. At one or more second time intervals, a master information block is transmitted that occupies a part of the first bandwidth of the radiofrequency resource, wherein the part of the first bandwidth of the radiofrequency resource has a second bandwidth that is smaller than the first bandwidth and is receivable by a second type of communication device having reduced receive bandwidth capabilities compared to those of the first type of communication device. The master information block comprises a first part and a second part, wherein the first part comprises first part information that is necessary to enable the first type of communication device to establish the connection with the host cell. The second part comprises second part information that directly or indirectly enables the second type of communication device to obtain parameters that enable the second type of communication device to establish a connection with the host cell.

In an aspect of some embodiments consistent with the invention, the second part information identifies timing and/or frequency locations at which extended broadcast information will be transmitted, wherein the extended broadcast information directly or indirectly enables the second type of communication device to establish the connection with the host cell. In some but not necessarily all of these embodiments, the extended broadcast information provides parameters that enable the second type of communication device to perform a random access procedure directed at the host cell. The parameters can, for example in some embodiments, include a random access channel sequence to be used during the random access procedure. As another example, the parameters can include information that identify one or more time and frequency positions at which the second type of communication device can perform the random access procedure directed at the host cell.

In an aspect of some but not necessarily all embodiments, the extended broadcast information identifies a time and frequency position at which a special system information block (M-SIB) will be transmitted, wherein the M-SIB is a system information block that includes information that is for use by the second type of communication device.

In an aspect of some but not necessarily all embodiments, the extended broadcast information identifies a modulation coding scheme that will be used when an M-SIB is transmitted, wherein the M-SIB is a system information block that includes information that is for use by the second type of communication device.

In an aspect of some but not necessarily all embodiments, the extended broadcast information is a control channel adapted to be receivable by the second type of communication device. In some but not necessarily all of these embodiments, the control channel adapted to be receivable by the second type of communication device includes information that enables the second type of communication device to receive an M-SIB that is adapted to be receivable by the second type of communication device.

In an aspect of some but not necessarily all embodiments, the second part information provides parameters that enable the second type of communication device to perform a random access procedure directed at the host cell. In some but not necessarily all of these embodiments, the parameters include a random access channel sequence to be used during the random access procedure. As another example in some but not necessarily all of these embodiments, the parameters include information that identify one or more time and frequency positions at which the second type of communication device can perform the random access procedure directed at the host cell.

In an aspect of some but not necessarily all embodiments, the second part information includes a set of possible time and frequency resources and modulation and coding schemes for the second type of communication device to use in a blind decoding procedure that detects whether extended broadcast information has been transmitted. In some but not necessarily all of these embodiments, the cellular communication system operates in accordance with a Long Term Evolution (LTE) standard, and the extended broadcast information is any one of a system information block (SIB), an M-SIB, and a special physical downlink control channel (M-PDCCH) adapted for use by the second type of communication device.

In an aspect of some but not necessarily all embodiments, the second part of the master information block includes a field encoded to indicate how the second type of communication device can obtain information that is specific to the second type of communication device. In some but not necessarily all of these embodiments, the field encoded to indicate how the second type of communication device can obtain information that is specific to the second type of communication device indicates in which one, out of a pre-defined set of time and frequency positions, the information that is specific to the second type of communication device is located.

DETAILED DESCRIPTION

Figure 1:
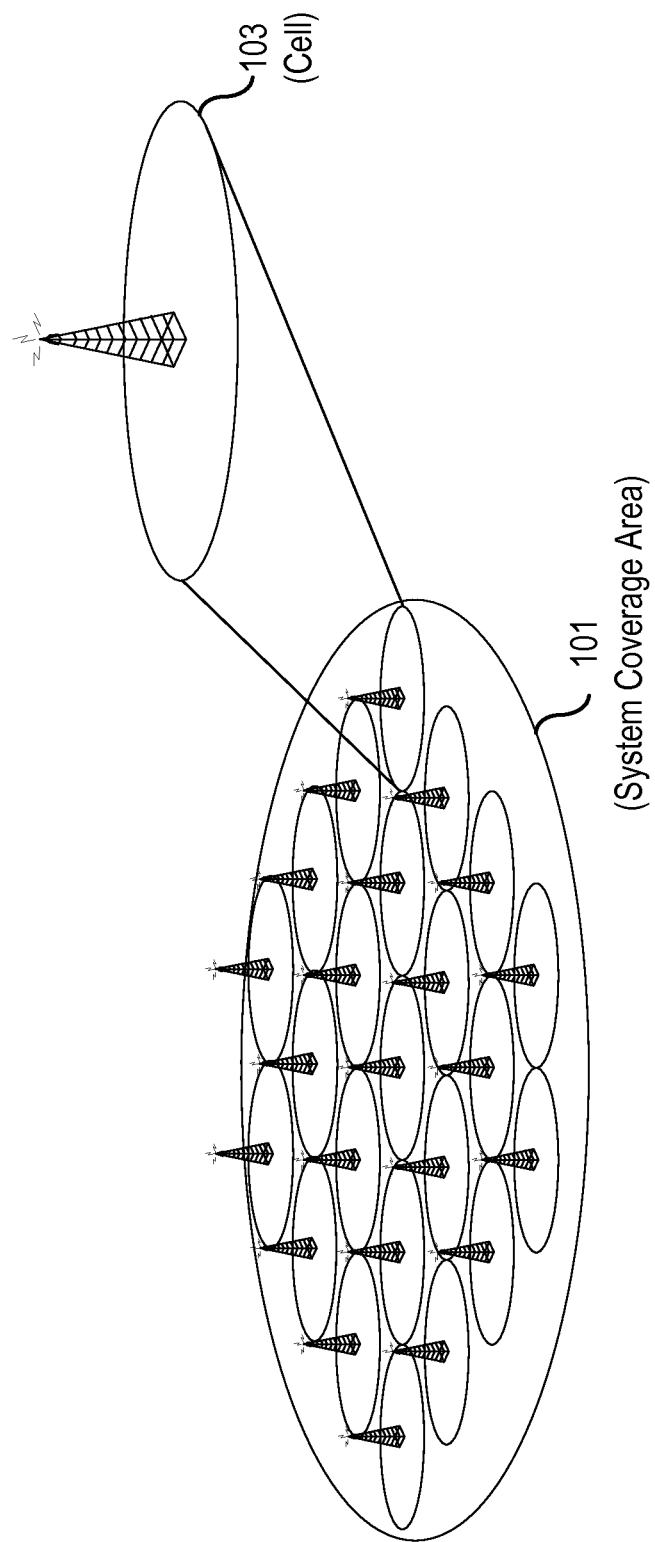
FIG. 1 illustrates a cellular communication system providing a system coverage area by means of a plurality of cells.

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system or other hardware capable of executing programmed instructions. It will be recognized that in each of the embodiments, the various actions could be performed by specialized circuits (e.g., analog and/or discrete logic gates interconnected to perform a specialized function), by one or more processors programmed with a suitable set of instructions, or by a combination of both. The term "circuitry configured to" perform one or more described actions is used herein to refer to any such embodiment (i.e., one or more specialized circuits and/or one or more programmed processors). Moreover, the invention can additionally be considered to be embodied entirely within any form of computer readable carrier, such as solid-state memory, magnetic disk, or optical disk containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments as described above may be referred to herein as "logic configured to" perform a described action, or alternatively as "logic that" performs a described action.

In an aspect of embodiments consistent with the invention, a network node that serves a cell in a cellular communication system supports a conventional standards-compliant communication device (e.g., a first type of communication device capable of receiving a signal having a full bandwidth of the cellular communication system ("first bandwidth")). This cell is herein denoted a "host cell." The network node also supports a second type of communication device (e.g., an MTC device) that is capable of receiving a signal no larger than a second bandwidth, wherein the second bandwidth is smaller than the first bandwidth. Merely for the sake of convenience, reference will be made throughout this document to "MTC device(s)". However, machine type communication is not an essential aspect of the invention. Rather, the various aspects of embodiments consistent with the invention are applicable to any second type of communication device that is capable of receiving a signal no larger than the second bandwidth, even if that second type of communication device involves human interaction. Accordingly, all references to one or more "MTC devices" should be construed generally to include all forms of second type of communication devices, including but not limited to actual machine type communication devices as well as other devices.

For example, taking an LTE system as a non-limiting example (the various aspects of the invention are applicable to other systems as well), the network node can allocate some of its resources, including special MTC-oriented control and data channels, to occupy no more than the second bandwidth (e.g., 6 RBs). In this way, a new set of entities are defined, such as physical channels and system information, targeting communication with MTC devices. The new entities as described herein, in many instances, correspond to entities in legacy LTE systems. Because the invention is not limited for use only by machine type communication, the new entities will be denoted throughout this description by adding the prefix "M-" to the more traditional term. The "M-" can be considered broadly to refer to "MTC", "Modified", "Mini", or any other type of cell or aspect that can be considered to be intended for use by MTC devices (as that term is broadly construed) and which are auxiliary to or, in some circumstances, subordinate to entities of the host cell. Accordingly, the collection of aspects/entities of a host cell that supports MTC devices is herein referred to as an "M-cell", and any reference to "M-cell" may refer to any one, or any combination, or all of those aspects/entities, depending on the context of discussion. Remaining resources (e.g., radiofrequency resources) in the LTE system can be used to support the fully capable, legacy communication devices (i.e., the "first type of communication devices"). Thus, the service areas of the "host cell" and the "M-cell" can be geographically coincident.

Again taking LTE systems as a non-limiting example, in some embodiments, the M-cells may be created by reserving RB pairs that are adjacent in frequency in an ordinary (legacy) subframe, and transmitting an M-PDCCH at an OFDM symbol position that is different from the symbol position occupied by the host cell's PDCCH. As an alternative, particular subframes can be reserved in which M-PDCCHs are transmitted at an OFDM symbol position that would otherwise be occupied by the host cell's PDCCH.

The M-PDCCH may carry the same type of information as the legacy (host cell) PDCCH, including resource block allocation, transport format, and HARQ information necessary to demodulate the downlink data channel, as well as uplink related control information such as scheduling grants and power control commands. However, the M-PDCCH may also contain less or more information, and be encoded differently from the PDCCH.

Mobility can still be based on the central 6 RBs (or comparable small bandwidth in an equivalent communication system) of the host cell in order to avoid repetition of signaling. Moreover, system information, which in some sense can be considered to be conveyed on an M-SI channel, can be transmitted in a coordinated fashion, again avoiding repetition of signaling.

Figure 2:
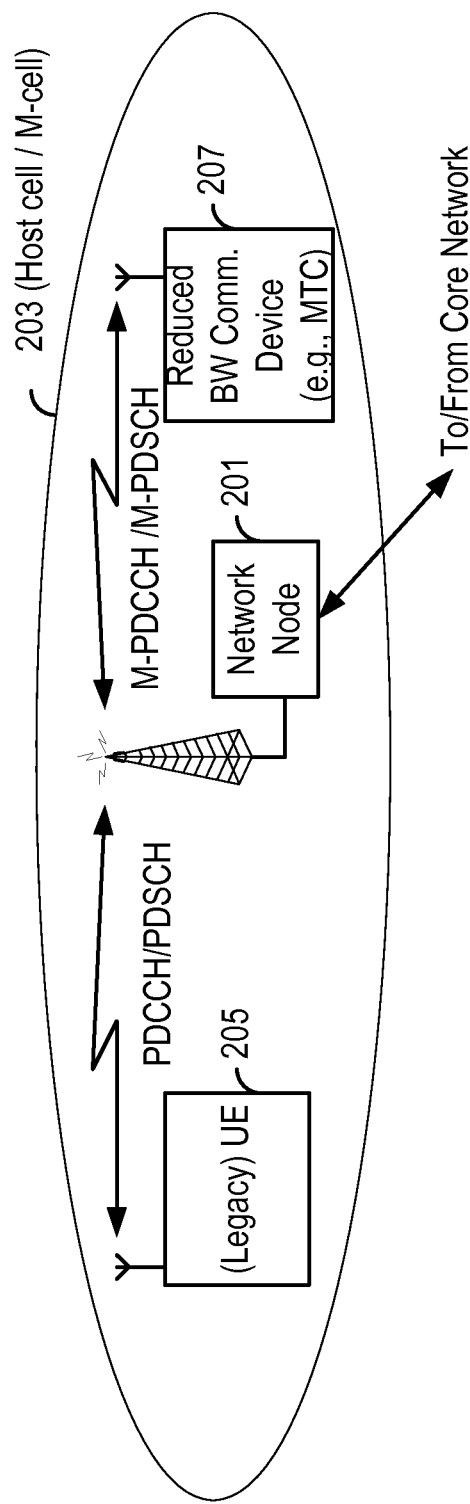
FIG. 2 illustrates a network node 201 that is operated in accordance with some aspects of the invention so as to provide a cell 203 that is both a host cell and an MTC cell.

FIG. 2 illustrates a network node 201 that is operated in accordance with some aspects of the invention so as to provide a cell 203 that is both a host cell and an M-cell. To support a standard-compatible (legacy) UE 205, the node 201 allocates some of its radiofrequency resources for use as, for example, a PDCCH and PDSCH as are known according to the communication system standard. In order to allow a reduced bandwidth communication device (e.g., an MTC device) 207 to also connect to and utilize the communication system, the node 201 also allocates other parts of its radiofrequency resources for use as, for example, an M-PDCCH and M-PDSCH. As mentioned earlier, these channels substantially correspond to their legacy system counterparts (although they may differ in some aspects, as also mentioned above) but are sized and timed to permit the reduced bandwidth communication device to connect to and utilize the communication system.

These and other aspects will now be described in greater detail. To facilitate the reader's understanding of the variously described features, the terminology and features associated with an LTE system are used. However, this is done only for the purpose of example, and is not intended to suggest that the various embodiments consistent with the invention are useable only in an LTE system. To the contrary, the various embodiments consistent with the invention are useable in any comparable communication system that presents the same problem as a conventional LTE system (e.g., imposing bandwidth and/or processing power requirements that go beyond what any practical MTC device is capable of satisfying) and provides the ability to allocate resources in a way that is comparable to a conventional LTE system.

Figure 3:
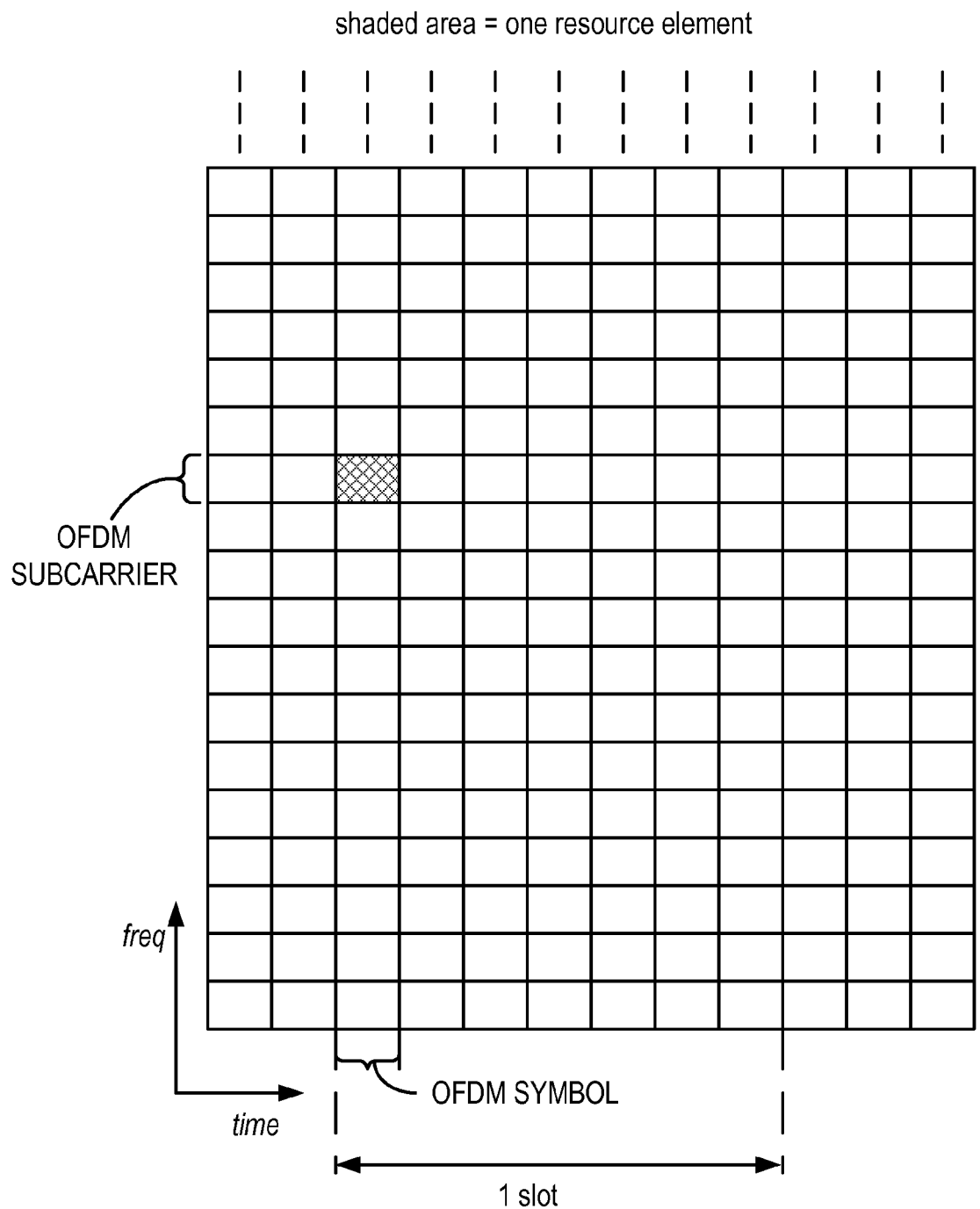
FIG. 3 illustrates a time-frequency grid an exemplary LTE downlink physical resource ("resource element") that corresponds to one OFDM subcarrier during one OFDM symbol interval.

The LTE physical layer downlink transmission is based on OFDM. The basic LTE downlink physical resource can thus be seen as a time-frequency grid as illustrated in FIG. 3, in which each so-called "resource element" corresponds to one OFDM subcarrier during one OFDM symbol interval.

Figure 4:
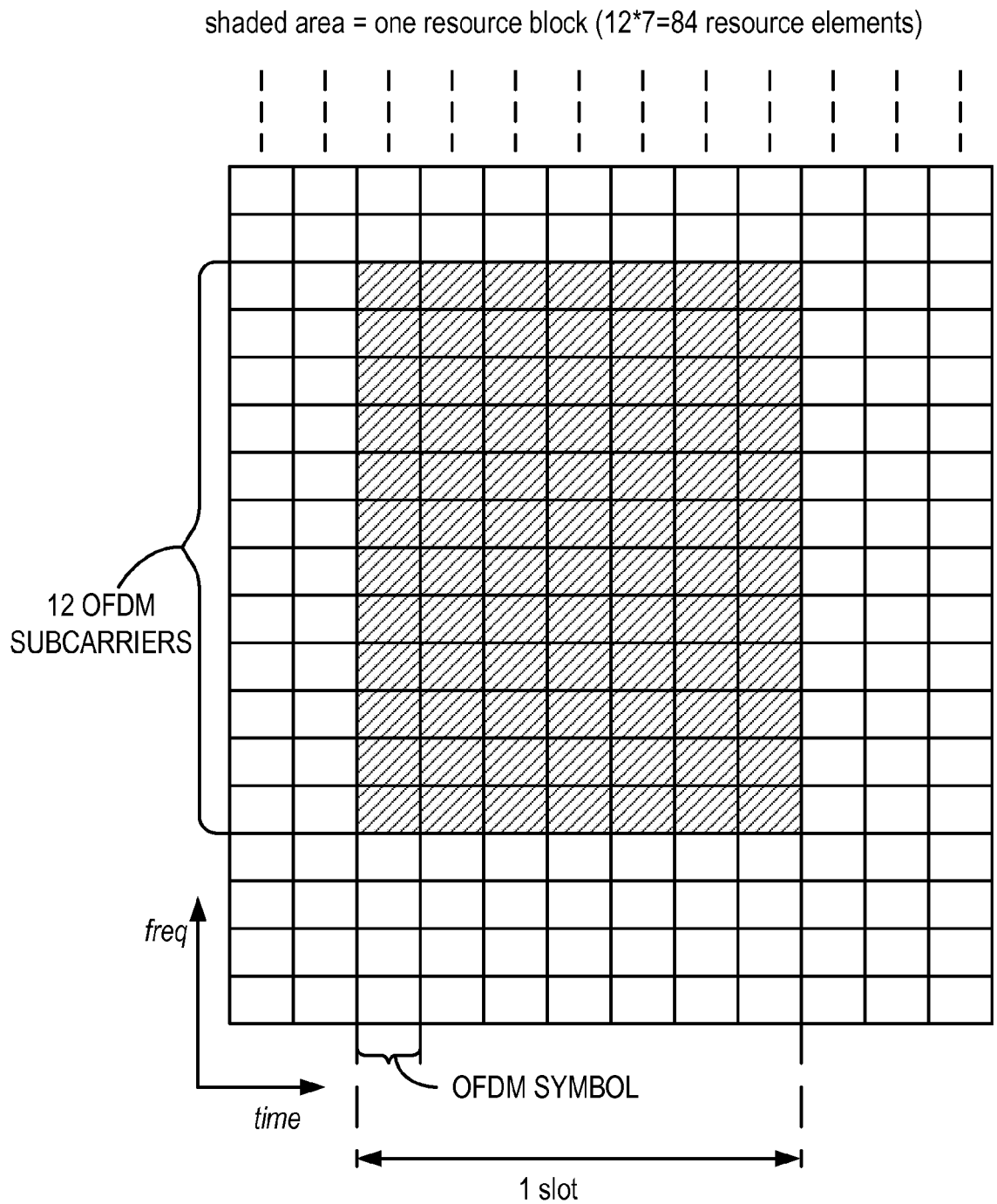
FIG. 4 is a time-frequency grid illustrating how downlink subcarriers in the frequency domain are grouped into resource blocks.

As illustrated in FIG. 4, the downlink subcarriers in the frequency domain are grouped into resource blocks (RBs), where each resource block consists of twelve subcarriers for a duration of one 0.5 ms slot (7 OFDM symbols when normal cyclic prefixes are used (as illustrated) or 6 OFDM symbols when extended cyclic prefixes are used), corresponding to a nominal resource-block bandwidth of 180 kHz.

The total number of downlink subcarriers, including a DC-subcarrier, thus equals $N_c=12 \cdot N_{RB}+1$ where $N_{RB}$ is the maximum number of resource blocks that can be formed from the $12 \cdot N_{RB}$ usable subcarriers. The LTE physical-layer specification actually allows for a downlink carrier to consist of any number of resource blocks, ranging from $N_{RB-min}=6$ and upwards, corresponding to a nominal transmission bandwidth ranging from 1.4 MHz up to 20 MHz. This allows for a very high degree of LTE bandwidth/spectrum flexibility, at least from a physical-layer-specification point-of-view.

Figure 5A:
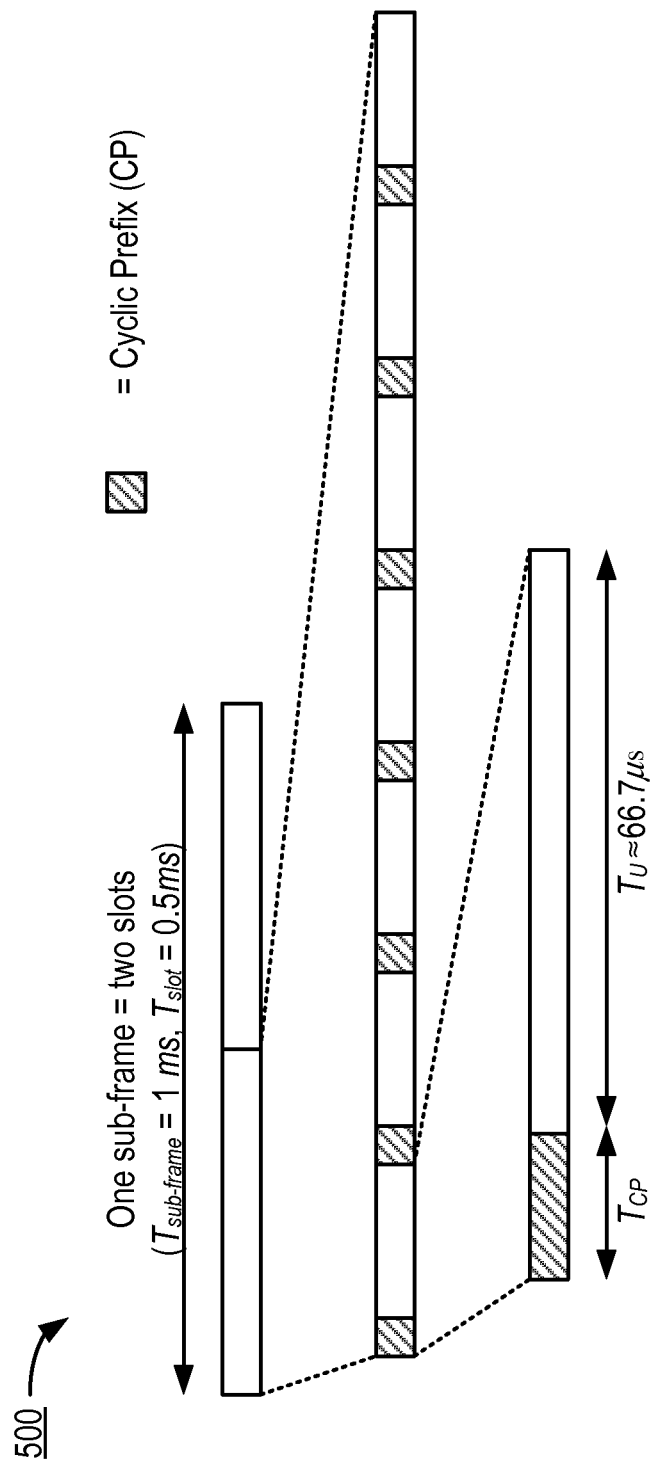
FIG. 5a illustrates a so-called "normal" cyclic prefix length, which allows seven OFDM symbols per slot to be communicated.
Figure 5B:
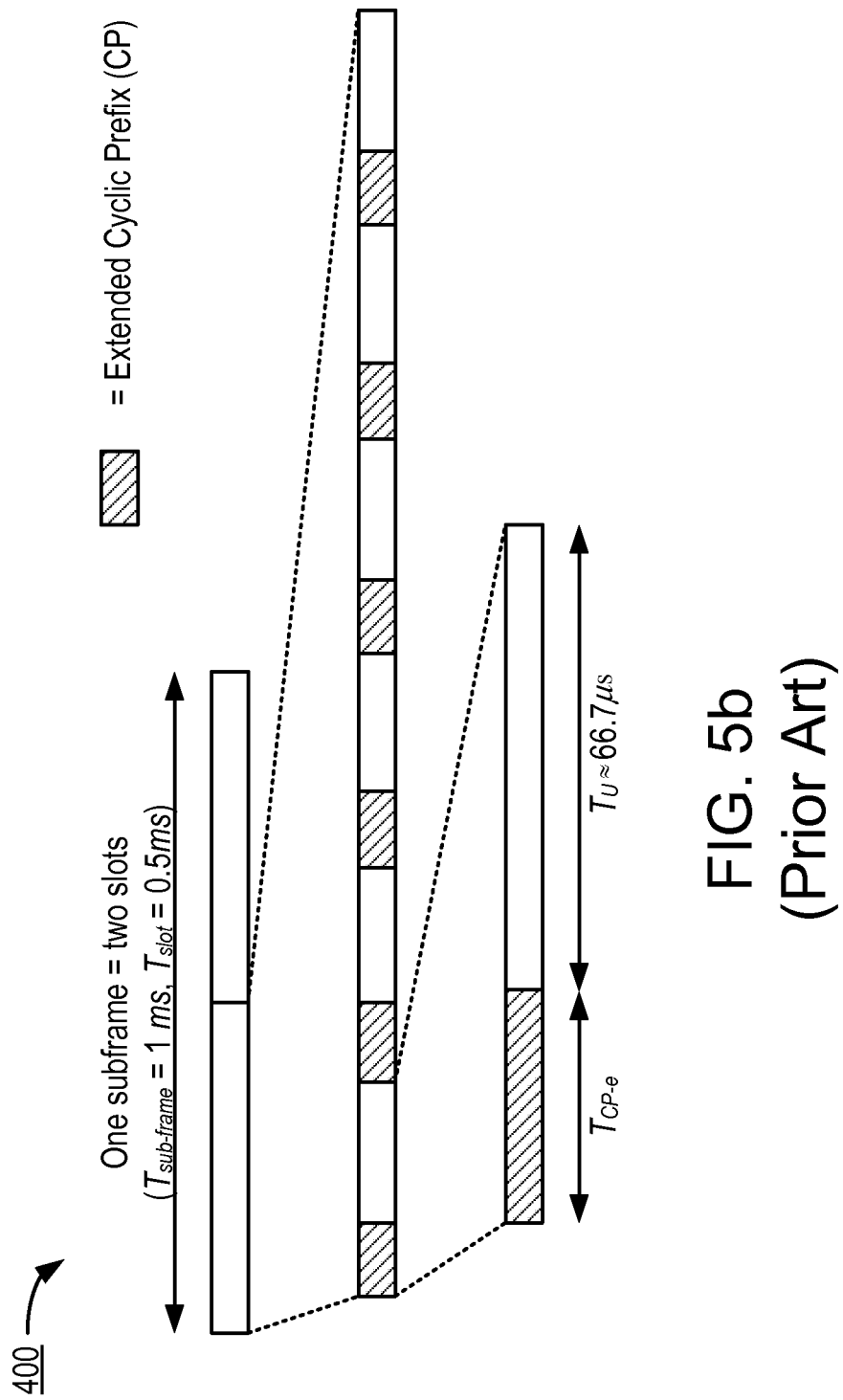
FIG. 5b illustrates an extended cyclic prefix, which because of its longer size, allows only six OFDM symbols per slot to be communicated.

FIGS. 5a and 5b illustrate the time-domain structure for LTE downlink transmission. Each 1 ms subframe 500 consists of two slots of length $T_{slot}=0.5$ ms ($=15360 \cdot T_S$, wherein each slot comprises 15,360 time units, $T_S$). Each slot then consists of a number of OFDM symbols.

A subcarrier spacing $\Delta f=15$ kHz corresponds to a useful symbol time $T_u=1/\Delta f \approx 66.7$ μs ($2048 \cdot T_S$). The overall OFDM symbol time is then the sum of the useful symbol time and the cyclic prefix length $T_{CP}$. Two cyclic prefix lengths are defined. FIG. 5a illustrates a normal cyclic prefix length, which allows seven OFDM symbols per slot to be communicated. The length of a normal cyclic prefix, $T_{CP}$, is $160 \cdot T_S \approx 5.1$ μs for the first OFDM symbol of the slot, and $144 \cdot T_S \approx 4.7$ μs for the remaining OFDM symbols.

FIG. 5b illustrates an extended cyclic prefix, which because of its longer size, allows only six OFDM symbols per slot to be communicated. The length of an extended cyclic prefix, $T_{CP-e}$, is $512 \cdot T_S \approx 16.7$ μs.

It will be observed that, in the case of the normal cyclic prefix, the cyclic prefix length for the first OFDM symbol of a slot is somewhat larger than those for the remaining OFDM symbols. The reason for this is simply to fill out the entire 0.5 ms slot, as the number of time units per slot, $T_S$, (15360) is not evenly divisible by seven.

When the downlink time-domain structure of a resource block is taken into account (i.e., the use of 12 subcarriers during a 0.5 ms slot), it will be seen that each resource block consists of 12·7=84 resource elements for the case of normal cyclic prefix (illustrated in FIG. 4), and 12·6=72 resource elements for the case of the extended cyclic prefix (not shown).

Another important aspect of a terminal's operation is mobility, which includes cell search, synchronization, and signal power measurement procedures. Cell search is the procedure by which the terminal finds a cell to which it can potentially connect. As part of the cell search procedure, the terminal obtains the identity of the cell and estimates the frame timing of the identified cell. The cell search procedure also provides estimates of parameters essential for reception of system information (SI) on the broadcast channel, containing the remaining parameters required for accessing the system.

To avoid complicated cell planning, the number of physical layer cell identities should be sufficiently large. For example, systems in accordance with the LTE standards support 504 different cell identities. These 504 different cell identities are divided into 168 groups of three identities each.

Figure 6:
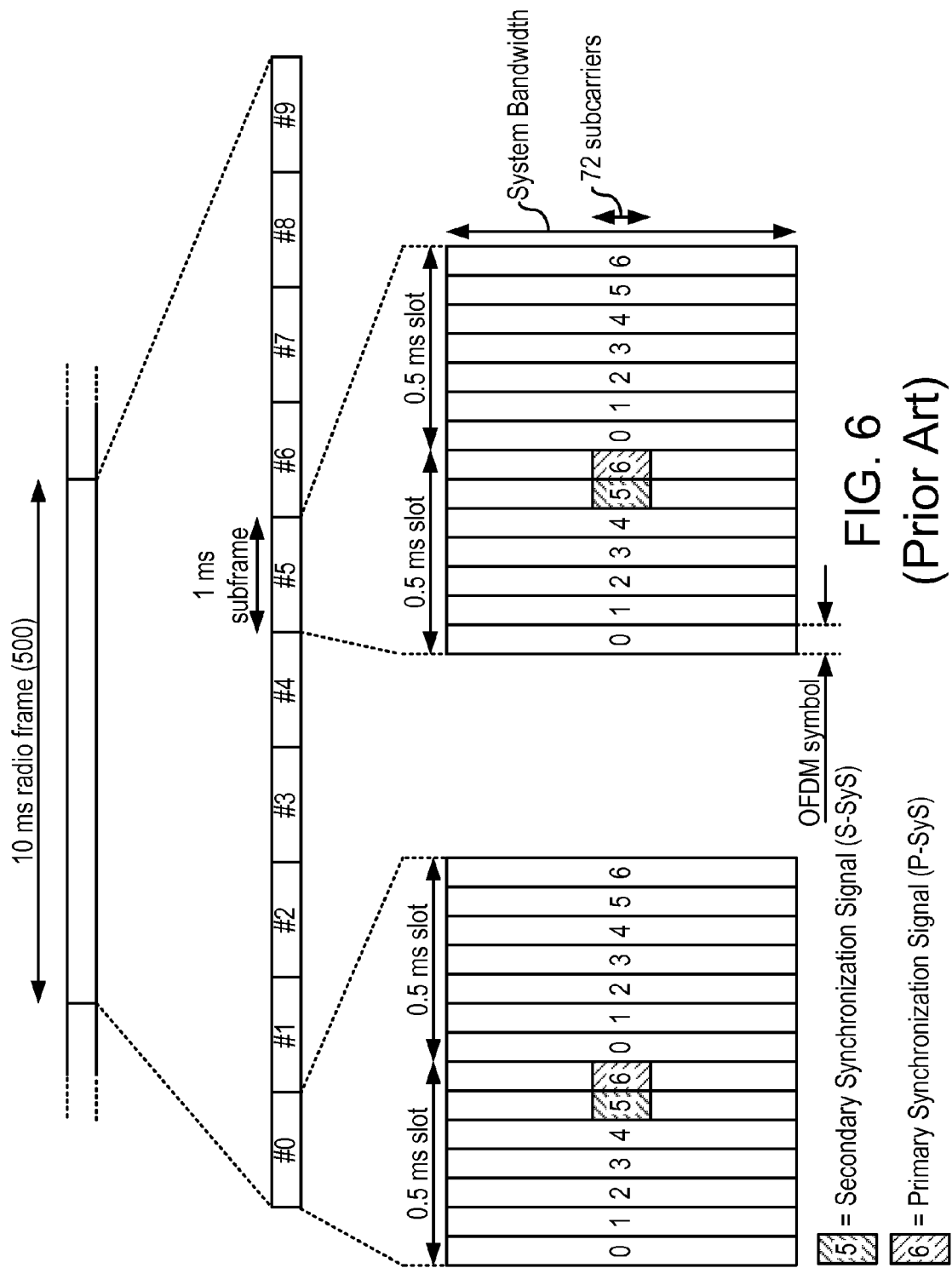
FIG. 6 illustrates the structure of the radio interface of an LTE system.

In order to reduce the cell-search complexity, cell search for LTE is typically done in several steps that make up a process that is similar to the three-step cell-search procedure of the known Wideband Code Division Multiple Access (WCDMA) system. To assist the terminal in this procedure, LTE provides a primary synchronization signal and a secondary synchronization signal on the downlink. This is illustrated in FIG. 6, which shows the structure of the radio interface of an LTE system. The physical layer of an LTE system includes a generic radio frame 600 having a duration of 10 ms. FIG. 6 illustrates one such frame 600 for an LTE Frequency Division Duplex (FDD) system. Each frame has 20 slots (numbered 0 through 19), each slot having a duration of 0.5 ms which normally consists of seven OFDM symbols. A subframe is made up of two adjacent slots, and therefore has a duration of 1 ms, normally consisting of 14 OFDM symbols. The primary and secondary synchronization signals are specific sequences, inserted into the last two OFDM symbols in the first slot of each of subframes 0 and 5. The primary synchronization signal can occupy less bandwidth than does the secondary synchronization signal. In addition to the synchronization signals, part of the operation of the cell search procedure also exploits reference signals that are transmitted at known locations in the transmitted signal.

Figure 7:
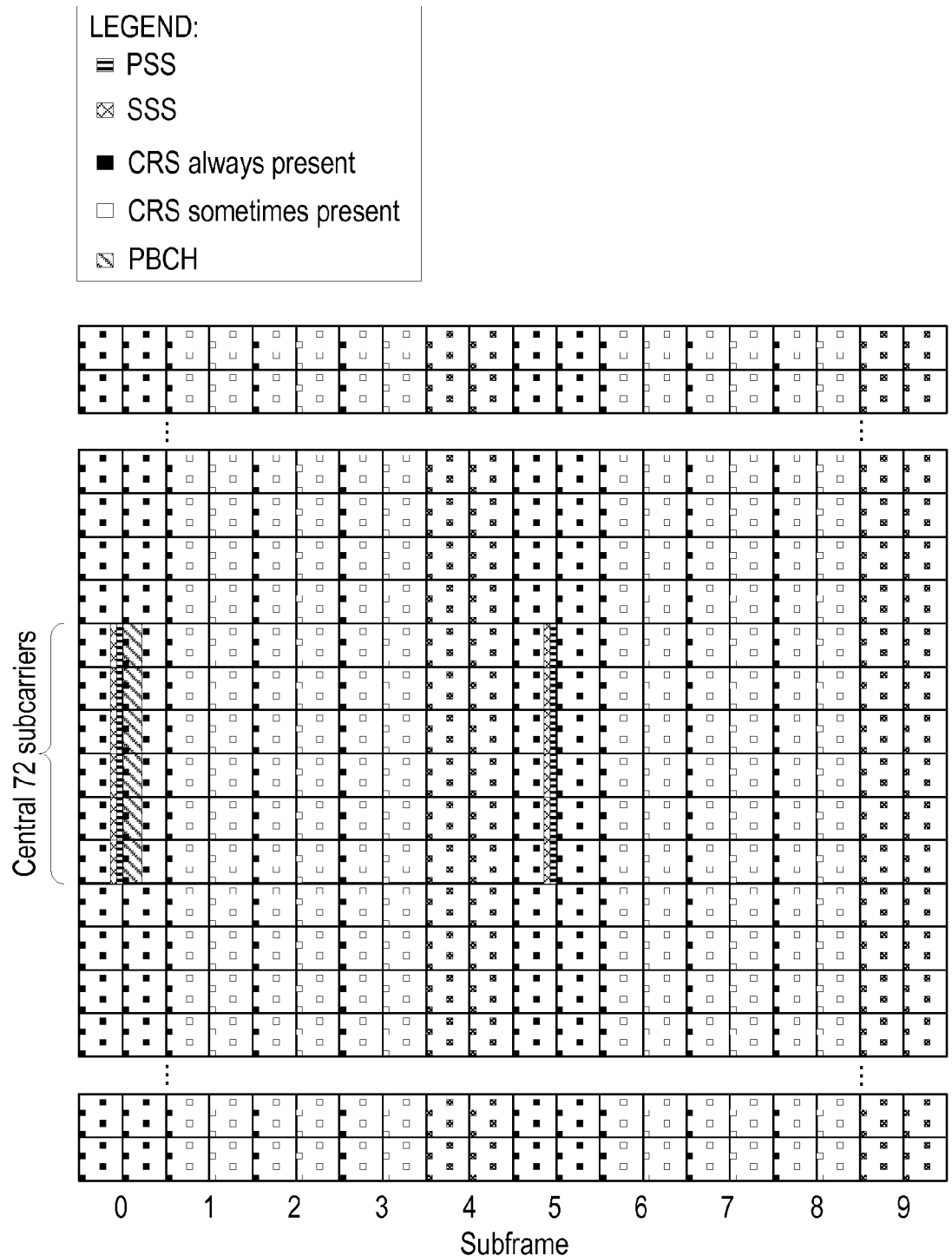
FIG. 7 is a depiction of the structure of the radio interface (time-frequency grid) of a legacy LTE system.

FIG. 7 is another depiction of the structure of the radio interface (time-frequency grid) of a legacy LTE FDD cell. It can be seen that the radiofrequency spectrum allocated to the legacy LTE FDD cell is wider than the smallest downlink system bandwidth of 1.4 MHz (72 subcarriers or 6 RBs). Subframes 1-3 and 6-8 may be used for MBSFN or may be signaled to be used for other purposes, in which case a UE cannot expect reference signals in more than the first OFDM symbol interval. (To avoid cluttering the figure, it does not show each o the OFDM symbol intervals within each subframe.) The Physical Broadcast Channel (PBCH) (carrying the MIB) and synchronization signals are transmitted at prior known OFDM symbol positions over the central 72 subcarriers.

Operating a node (e.g., the node 201) to concurrently support a host cell and an M-cell includes a number of aspects, some of which are alternatives to others, and with some alternatives being usable together. This will become clearer as the various embodiments consistent with the invention are described.

Figure 8:
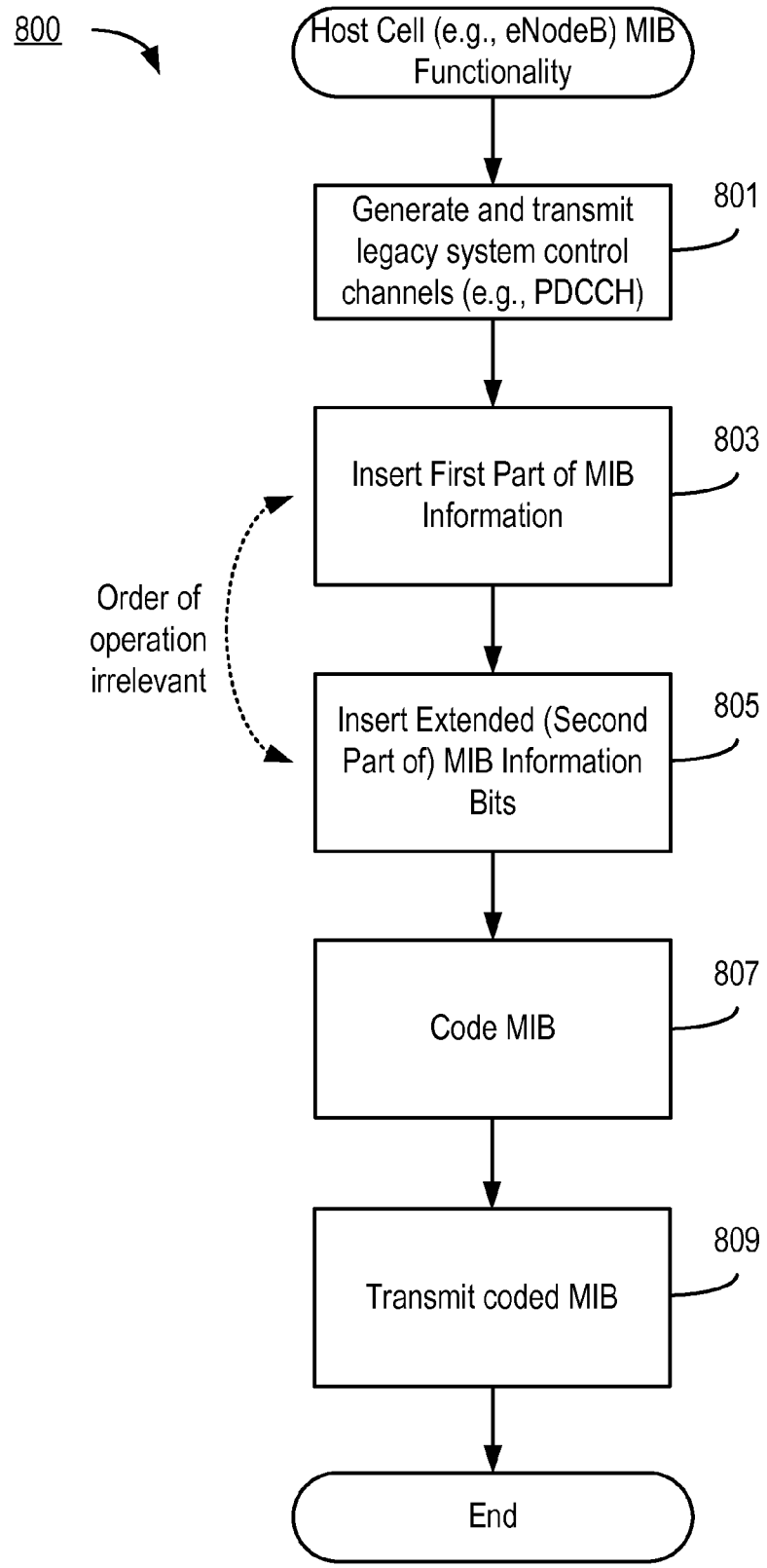
FIG. 8 is, in one respect, a flow chart of steps/processes performed by a communication system node in accordance with exemplary embodiments of the invention.

FIG. 8 is, in one respect, a flow chart of steps/processes performed by a communication system node (e.g., an eNodeB, or "eNB" in an LTE system) in accordance with some but not necessarily all exemplary embodiments of the invention. In another respect, FIG. 8 can be considered to depict exemplary means 800 comprising the various illustrated circuitry (e.g., hard-wired and/or suitably programmed processor) configured to perform the described functions.

The node continues to support legacy devices, (e.g., legacy LTE UE's), and so continues to generate and transmit legacy system control channels, such as the PDCCH, which spans the entire bandwidth of the legacy system (step 801).

To support an MTC device, the node needs to provide the MTC device with information that will enable the MTC device to establish a connection to the node. In one aspect of embodiments consistent with the invention, at least some of this MIB-related information is included within the legacy system MIB, which needs to be large enough to include all of the system-defined legacy information as well as the new MIB-related information as described herein. Even including the additional information, however, the frequency-wise size of the MIB does not exceed the MTC device's receive capability.

As illustrated in FIG. 8, the node inserts a first part of MIB information (e.g., MIB information as defined by the legacy system, such as MIB information for mobile broadband devices as defined by Rel-10 of the LTE standard) into a data structure buffer representing the MIB prior to transmission (step 803). Extended MIB information bits (a second part of the MIB information), representing the additional MIB-related information that supplies at least some of the information needed by an MTC device to establish a connection with the node is also inserted into the data structure buffer (step 805). For example, the LTE standard defines a MIB such that it includes spare bits. These spare bits can be used for conveying the MTC-related information, such as time- and/or frequency-wise locations of resource blocks or resource elements that the MTC device needs to receive and decode for further information to be able to connect to the M-cell.

It is irrelevant whether step 805 is performed before or after step 803. Once all of the MIB data has been assembled, the MIB is coded according to any known technique (step 807) such that a legacy UE 205 is able to decode the first part of the MIB, and an MTC device 207 is able to decode both the first and the second parts of the MIB. The coded MIB is then transmitted from an antenna associated with the node (step 809).

Figure 9:
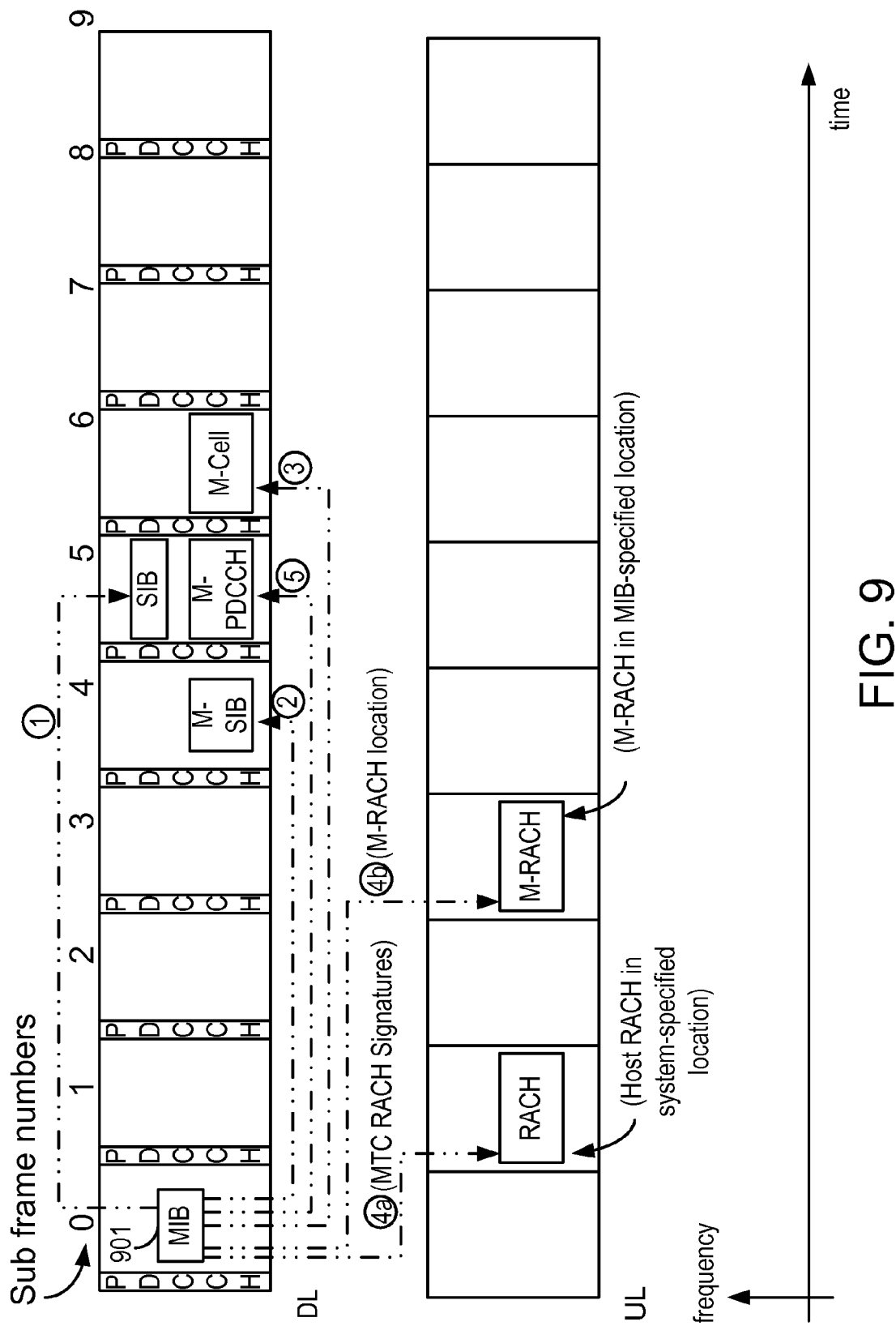
FIG. 9 is a timing/frequency diagram of a MIB and its relationship to various other MTC elements within the host cell spectral resources.

As mentioned earlier, the MIB supplies an MTC device with information that is useful for enabling the MTC device to locate an M-cell and/or to locate an M-PDCCH and/or to locate an M-SI, and/or to know how it can perform an M-RACH procedure. These aspects will now be described in further detail with reference to FIG. 9, which is a timing/frequency diagram of a MIB 901 and its relationship to various other MTC elements within the host cell spectral resources.

In one aspect, the MIB 901 (which occupies its standard location in the host cell) includes time/frequency information (represented by the number "1" enclosed in a circle) that informs the MTC device of a location of the resource blocks and/or modulation and coding scheme (MCS) allocated to the first system information block (SIB 1) that is transmitted in a system standardized location (e.g., in subframe 5 in an LTE system). The first SIB, which is a legacy SIB, is allocated frequency resources such that it can be read by an MTC device. It includes such information as the RACH time/frequency grid and RACH signatures.

In another aspect, the MIB 901 includes time/frequency information (represented by the number "2" enclosed in a circle) that informs the MTC device of a location of the resource blocks (or subset resource elements within certain resource blocks) and/or MCS allocated to a specific M-SIB that is transmitted in a certain subframe.

In still another aspect, the MIB 901 includes time/frequency information (represented by the number "3" enclosed in a circle) that informs the MTC device of a location of the resource blocks and/or MCS allocated to a specific M-cell. Armed with this information, the MTC device is then able to determine (e.g., via standardization) positions of an M-MIB and/or M-SIB(s) associated with the M-cell.

In still another aspect, the MIB 901 includes a set of MTC-specific RACH sequences and/or RACH regions in the time/frequency grid to be used by the MTC device for connection setup. In a first variant (represented by the reference characters "4a" enclosed in a circle), the MTC device will be using the host system's standard RACH, which is located in a time/frequency location specified by the network node (e.g., eNodeB in an LTE system). Therefore, the MIB 901 does not necessarily need to provide location information to the MTC device, but it does at least include the MTC-specific RACH sequence that should be used when performing connection setup via the RACH. In a second variant (represented by the reference characters "4b" enclosed in a circle), the MTC device will be using an MTC-specific RACH. Therefore, the MIB includes at least the RACH region in the time/frequency grid to be used by the MTC device for connection setup. As explained earlier, the MTC device may be able to derive the RACH sequence to use during a RACH procedure without further assistance from node. Alternatively, the MIB can also supply this M-RACH sequence to the MTC device.

In another aspect (represented by the number "5" enclosed in a circle), the MIB 901 indicates the resource blocks, reference signal sequence, or search space allocated to a specific M-PDCCH, which should occupy regions of the host system's radiofrequency spectrum that are different from the host system's own (legacy) PDCCH locations. The M-PDCCH supplies control information to the MTC device, including MTC specific SIBs or downlink assignments pointing to the SIBs that are intended for this MTC device. The M-PDCCH may comply with the legacy PDCCH format for the MTC device's lower bandwidth, or it may alternatively be encoded using a new format (e.g., Relay Physical Downlink Control Channel—"R-PDCCH").

In still another aspect (not shown in the figure in order to avoid an undue amount of clutter), the MIB 901 includes a direct or indirect reference to a set of different resource blocks and/or MCS allocations among which the device can perform blind decoding in order to find system information mentioned above. Elements that can be blind decoded include a SIB, M-SIB, and/or M-PDCCH. In a special non-limiting instance of this embodiment, a single bit of information can be used to indicate whether the system supports narrow band devices or not. If the system supports limited band devices, the device then searches a predefined set of possible SIB, M-SIB or M-PDCCH configurations to read system information.

In all of the described embodiments, additional MIB bits are used to point out how to obtain additional MTC-specific information. These additional MIB bits can be encoded in any suitable way, where a specific bit pattern, for example, corresponds to one specific location in the time/frequency grid out of a set of pre-defined locations.

Figure 10:
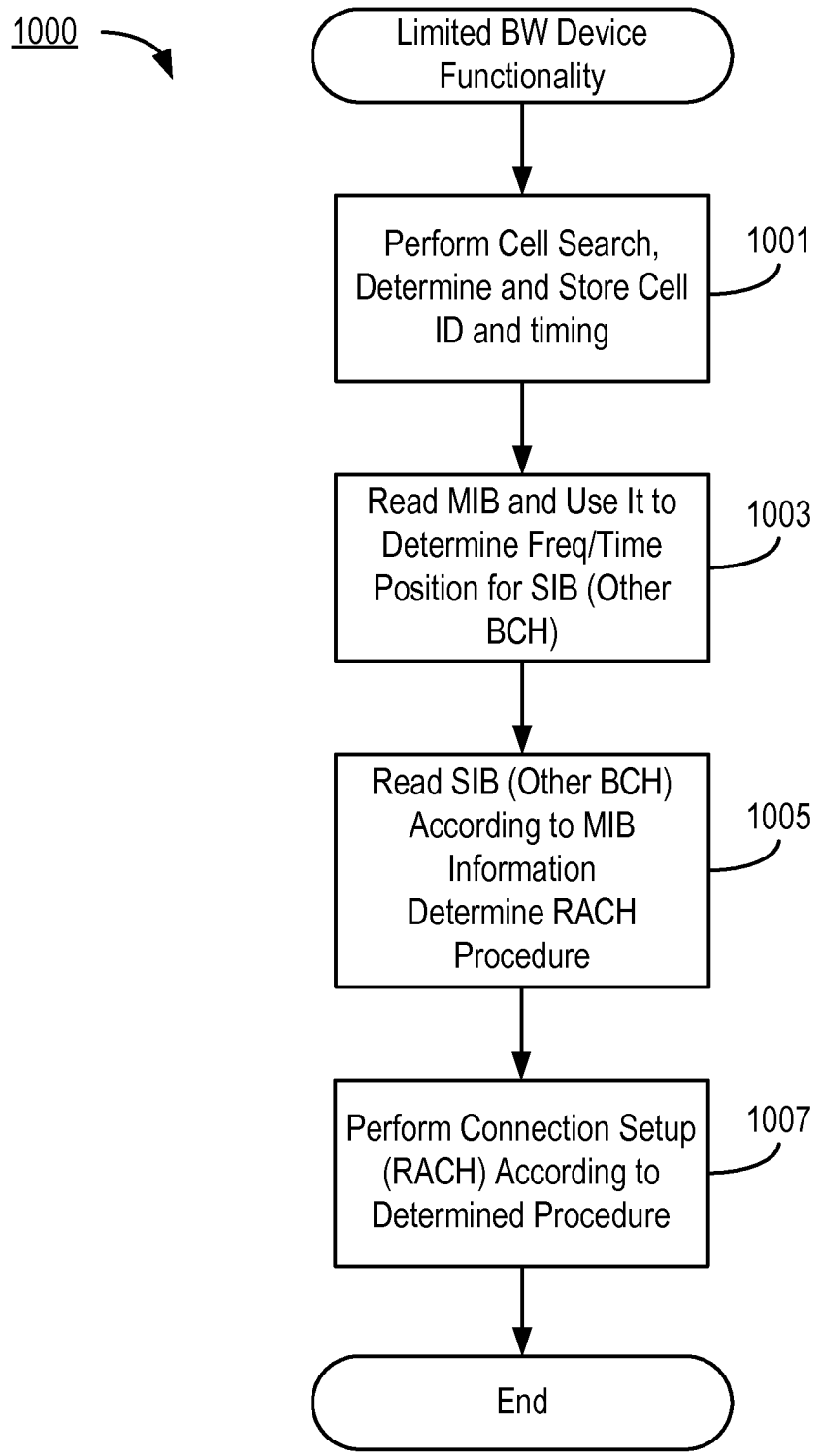
FIG. 10 is, in one respect, a flow chart of steps/processes performed by a limited bandwidth device (e.g., an MTC device) in accordance with some but not necessarily all exemplary embodiments of the invention.

FIG. 10 is, in one respect, a flow chart of steps/processes performed by a limited bandwidth device (e.g., an MTC device) to utilize an extended MIB (e.g., any of the embodiments depicted in FIG. 9) to connect to an M-cell in accordance with some but not necessarily all exemplary embodiments of the invention. In another respect, FIG. 10 can be considered to depict exemplary means 1000 comprising the various illustrated circuitry (e.g., hard-wired and/or suitably programmed processor) configured to perform the described functions.

The MTC device only needs to support a subset of the cell system bandwidth, and might also have different requirements with respect to response time compared to legacy system (e.g., LTE) mobile broadband devices. Accordingly, the MTC device regularly performs a cell search in order to find a suitable cell to camp on/connect to (step 1001). This is done using synchronization signals defined by the legacy system (e.g., in an LTE system, the primary and secondary synchronization signals, "PSS" and "SSS"). Even in a legacy system, this only requires a system bandwidth of 1.4 MHz, the signal itself occupying approximately 1 MHz, so the MTC device is fully capable of performing this procedure. Accordingly, any of the cell search algorithms that are known in the art and suitable for performing cell search in the legacy system can be used.

Once a cell is detected, the cell ID and timing (which is determined from the synchronization signals) are stored in the MTC device. The MTC device then receives and decodes the MIB which supplies the MTC device with MTC-specific information, such as but not limited to time/frequency position of resource blocks and/or resource elements that include broadcast information that the MTC device needs to receive and decode in order to connect to an M-cell (step 1003).

Then, the MTC device reads the extended MTC broadcast information to which it has been directly or indirectly led by the second part of the MIB information bits (step 1005). The extended MTC broadcast information can be in any of a number of different forms such as those discussed above with respect to FIG. 9. The extended MTC broadcast information conveys information about the MTC device RACH procedure (i.e., information that instructs the MTC device how to connect to the M-cell). Then, the MTC device follows the RACH procedure to make a random access to the M-cell (step 1007).

Figure 11:
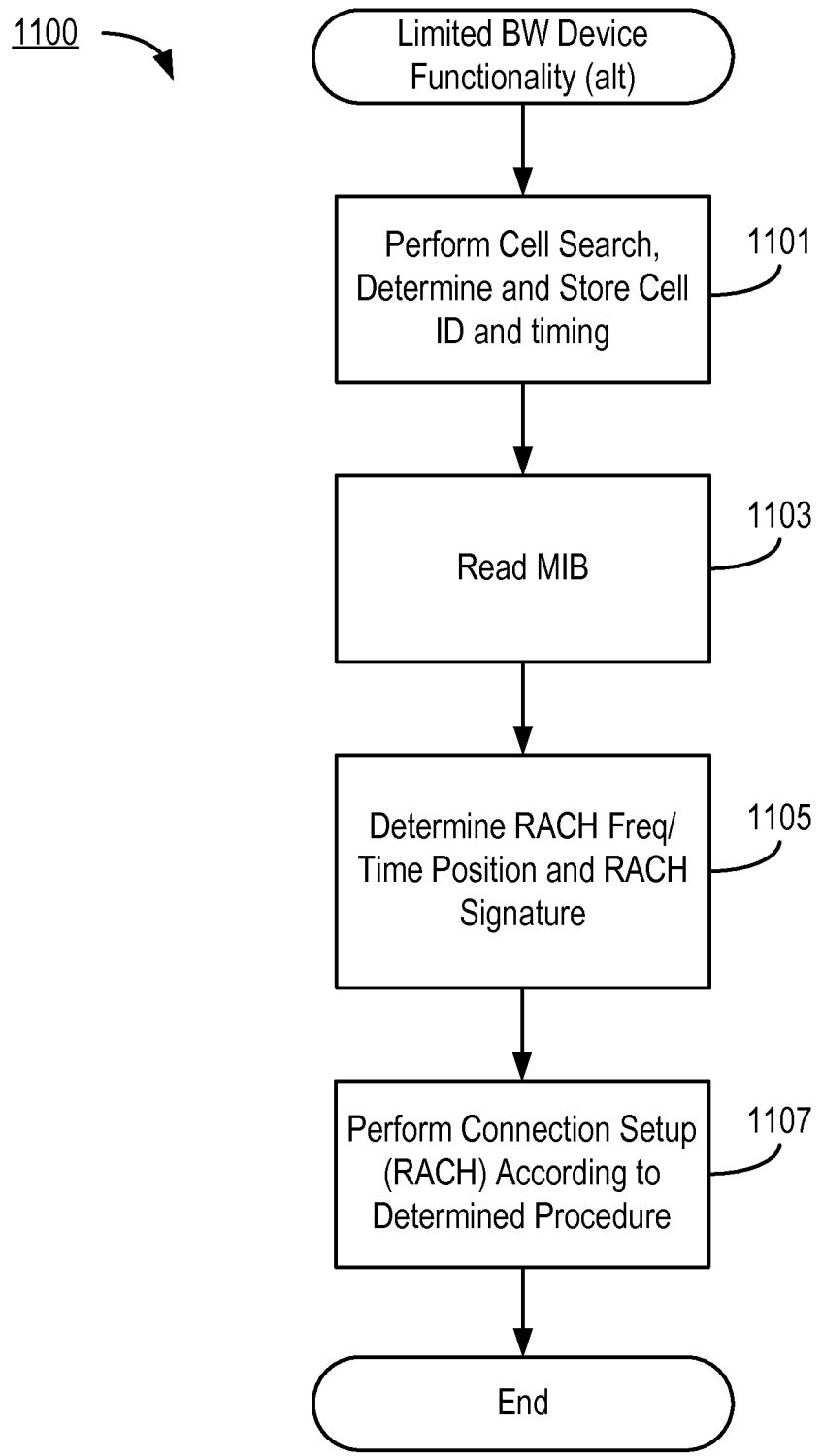
FIG. 11 is, in one respect, a flow chart of steps/processes performed by a limited bandwidth device to utilize an extended MIB to connect to an M-cell in accordance with exemplary alternative embodiments of the invention.

FIG. 11 is, in one respect, a flow chart of steps/processes performed by a limited bandwidth device (e.g., an MTC device) to utilize an extended MIB (e.g., any of the embodiments depicted in FIG. 9) to connect to an M-cell in accordance with exemplary alternative embodiments of the invention. In another respect, FIG. 11 can be considered to depict exemplary means 1100 comprising the various illustrated circuitry (e.g., hard-wired and/or suitably programmed processor) configured to perform the described functions.

The MTC device only needs to support a subset of the cell system bandwidth, and might also have different requirements with respect to response time compared to legacy system (e.g., LTE) mobile broadband devices. Accordingly, the MTC device regularly performs a cell search in order to find a suitable cell to camp on/connect to (step 1101). This is done using synchronization signals defined by the legacy system (e.g., in an LTE system, the primary and secondary synchronization signals, "PSS" and "SSS"). Even in a legacy system, this only requires a system bandwidth of 1.4 MHz, the signal itself occupying approximately 1 MHz, so the MTC device is fully capable of performing this procedure. Accordingly, any of the cell search algorithms that are known in the art and suitable for performing cell search in the legacy system can be used.

Once a cell is detected, the cell ID and timing (which is determined from the synchronization signals) are stored in the MTC device. The MTC device then receives and decodes the MIB (step 1103) which supplies the MTC device with MTC-specific information. In this embodiment, the MTC-specific information indicates the time/frequency position of resource blocks and/or resource elements that are the position on the air interface's time/frequency grid of where the MTC device should perform its random access (i.e., the location of the MTC device's RACH) and/or the RACH signature that the MTC device should use when accessing, for example, a standardized RACH (step 1105). The RACH sequence to use could be an implicit function of the cell identity, or the MIB could alternatively include information indicating which RACH sequence to use. The MTC device then makes a random access in accordance with the defined procedure that was determined from the MIB (step 1107).

Figure 12:
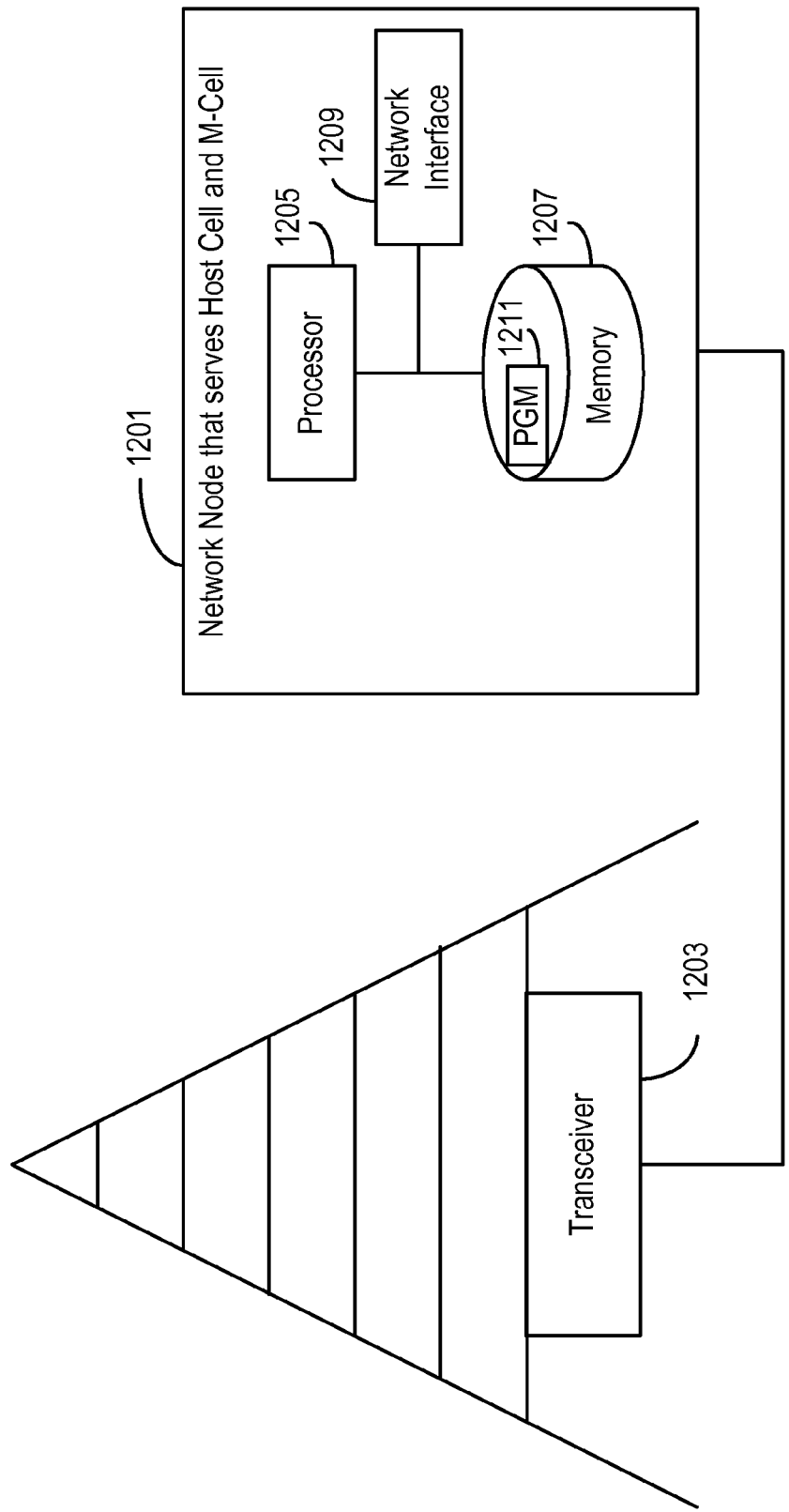
FIG. 12 is a block diagram of system elements for carrying out the various aspects of the invention.

FIG. 12 is a block diagram of system elements for carrying out the various aspects of the invention. In particular, a network node 1201 (e.g., an eNodeB configured to be capable of carrying out the functionality described above) is coupled to a transceiver 1203 that can send and receive signals for serving a host cell as well as one or more M-cells as described above. The network node 1201 includes circuitry configured to carry out any one or any combination of the MTC-related aspects described above with respect to actions taken by the node. Such circuitry could, for example, be entirely hard-wired circuitry (e.g., one or more Application Specific Integrated Circuits—"ASICs"). Depicted in the exemplary embodiment of FIG. 12, however, is programmable circuitry, comprising a processor 1205 coupled to one or more memory devices 1207 (e.g., Random Access Memory, Magnetic Disc Drives, Optical Disk Drives, Read Only Memory, etc.) and to a network interface 1209. The memory device(s) 1207 store program means 1211 (e.g., a set of processor instructions) configured to cause the processor 1205 to control other node elements so as to carry out any of the node-related aspects described above. The memory device(s) 1207 may also store data (not shown) representing various constant and variable parameters as may be needed by the processor 1205 when carrying out its functions such as those specified by the program means 1211. The network interface 1209 allows the node 1201 to communicate with other nodes (not shown) in the communication system.

Figure 13:
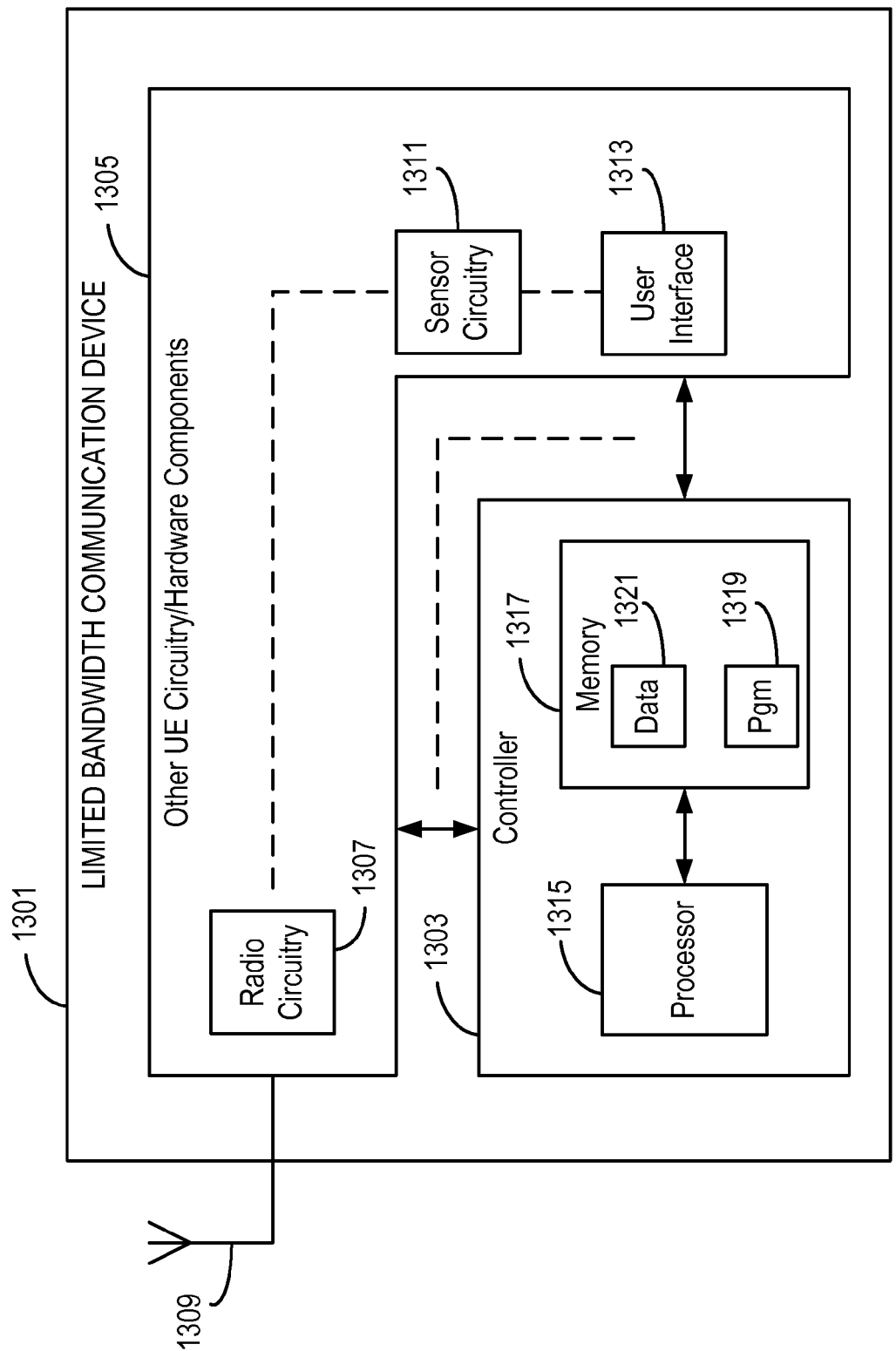
FIG. 13 is a block diagram of a limited bandwidth communication device in accordance with some exemplary embodiments of the invention.

FIG. 13 is a block diagram of an exemplary limited bandwidth communication device 1300, such as the MTC device used in the examples described above. The limited bandwidth communication device includes a controller 1303 coupled to other User Equipment (UE) circuitry/hardware components 1305 that enable the limited bandwidth communication device 1301 to perform its application-specific functionality (e.g., operating as a sensor of some sort) and also to operate as a communication device (e.g., to be able to communicate sensor data to a server, and possibly also to receive instructions). The other UE circuitry/hardware components 1305 are generally known in the art, and may include such elements as, for example and without limitation, radio circuitry 1307 coupled to one or more antennas 1309, and (optionally) sensor circuitry 1311 (e.g., temperature sensor, acoustical sensor, magnetic field sensor, etc.). The other UE circuitry/hardware may also include some sort of user interface (e.g., display, keyboard, switch(es)) 1313, although applications that call for use of a limited bandwidth communication device may have very simplistic needs for a user interface 1313 (e.g., a reset switch) or none at all.

The controller 1303 includes circuitry configured to carry out any one or any combination of the MTC-related aspects described above with respect to MTC device actions. Such circuitry could, for example, be entirely hard-wired circuitry (e.g., one or more ASICs). Depicted in the exemplary embodiment of FIG. 13, however, is programmable circuitry, comprising a processor 1315 coupled to one or more memory devices 1317 (e.g., Random Access Memory, Magnetic Disc Drives, Optical Disk Drives, Read Only Memory, etc.). The memory device(s) store program means 1319 (e.g., a set of processor instructions) configured to cause the processor 1315 to control the other UE circuitry/hardware components 1305 so as to carry out any of the MTC device-related aspects described above. The memory 1317 may also store data 1321 representing various constant and variable parameters as may be needed by the processor 1315 when carrying out its functions such as those specified by the program means 1319.

The various aspects of embodiments consistent with the invention as described above provide solutions to the problem in which a communication device supporting only a smaller bandwidth and/or longer response time relative to those of a legacy system s is not able to connect to a network having a higher bandwidth. The various aspects are applicable both for frequency division duplex (FDD) and time division duplex (TDD) operation.

The invention has been described with reference to particular embodiments. However, it will be readily apparent to those skilled in the art that it is possible to embody the invention in specific forms other than those of the embodiment described above.

For example, some of the illustrated exemplary embodiments show the M-cells occupying a bandwidth of a radiofrequency spectrum that is frequency-wise located within a bandwidth of the legacy system's (e.g., an LTE system's) allocated radiofrequency bandwidth. However, it will further be appreciated that the various illustrated steps and circuitry illustrated in other figures, as well as corresponding text, does not make this an essential feature of embodiments consistent with the invention. To the contrary, the legacy system (including its various control channels) can, in some embodiments, extend over no more than a first bandwidth of a radiofrequency spectrum, while the M-cell entities (including various M-cell control channels, random access channels, etc.) can extend over no more than a second bandwidth of the radiofrequency spectrum (the second bandwidth being smaller than the first bandwidth), without there being any restriction on whether the frequency-wise location of the second bandwidth falls within the frequency-wise location of the first bandwidth. For example, one or more of the various M-cell entities can, in some embodiments, lie wholly outside the radiofrequency band that the legacy communication system is permitted to use. For example, the pointers illustrated in FIG. 9 as any of the numbers "2", "3", and "5" enclosed in a circle can just as easily point to frequencies outside the first bandwidth of the radiofrequency spectrum.

Accordingly, the described embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method of operating a network node that serves a host cell in a cellular communication system, the method comprising:
   at one or more first time intervals, transmitting first control channel information on a control channel that extends over a first bandwidth of a radiofrequency resource, wherein the first control channel communicates information that is necessary to enable a first type of communication device to establish a connection with the host cell, the first type of communication device being capable of receiving a signal having the first bandwidth of the radiofrequency resource; and
   at one or more second time intervals, transmitting a master information block that occupies a part of the first bandwidth of the radiofrequency resource, wherein the part of the first bandwidth of the radiofrequency resource has a second bandwidth that is smaller than the first bandwidth and is receivable by a second type of communication device having reduced receive bandwidth capabilities compared to those of the first type of communication device,
   wherein the master information block comprises a first part and a second part, wherein the first part comprises first part information that is necessary to enable the first type of communication device to establish the connection with the host cell, and wherein the second part comprises second part information that directly or indirectly enables the second type of communication device to obtain parameters that enable the second type of communication device to establish a connection with the host cell.

2. The method of claim 1, wherein the second part information identifies timing and/or frequency locations at which extended broadcast information will be transmitted, wherein the extended broadcast information directly or indirectly enables the second type of communication device to establish the connection with the host cell.

3. The method of claim 2, wherein the extended broadcast information provides parameters that enable the second type of communication device to perform a random access procedure directed at the host cell.

4. The method of claim 3, wherein the parameters that enable the second type of communication device to perform the random access procedure directed at the host cell include a random access channel sequence to be used during the random access procedure.

5. The method of claim 3, wherein the parameters that enable the second type of communication device to perform the random access procedure directed at the host cell include information that identify one or more time and frequency positions at which the second type of communication device can perform the random access procedure directed at the host cell.

6. The method of claim 2, wherein the extended broadcast information identifies a time and frequency position at which a special system information block (M-SIB) will be transmitted, wherein the M-SIB is a system information block that includes information that is for use by the second type of communication device.

7. The method of claim 2, wherein the extended broadcast information identifies a modulation coding scheme that will be used when a special system information block (M-SIB) is transmitted, wherein the M-SIB is a system information block that includes information that is for use by the second type of communication device.

8. The method of claim 2, wherein the extended broadcast information is a control channel adapted to be receivable by the second type of communication device.

9. The method of claim 8, wherein the control channel adapted to be receivable by the second type of communication device includes information that enables the second type of communication device to receive a special system information block (M-SIB) that is adapted to be receivable by the second type of communication device, wherein the M-SIB is a system information block that includes information that is for use by the second type of communication device.

10. The method of claim 1, wherein the second part information provides parameters that enable the second type of communication device to perform a random access procedure directed at the host cell.

11. The method of claim 10, wherein the parameters that enable the second type of communication device to perform the random access procedure directed at the host cell include a random access channel sequence to be used during the random access procedure.

12. The method of claim 10, wherein the parameters that enable the second type of communication device to perform the random access procedure directed at the host cell include information that identify one or more time and frequency positions at which the second type of communication device can perform the random access procedure directed at the host cell.

13. The method of claim 1, wherein the second part information includes a set of possible time and frequency resources and modulation and coding schemes for the second type of communication device to use in a blind decoding procedure that detects whether extended broadcast information has been transmitted.

14. The method of claim 13, wherein the cellular communication system operates in accordance with a Long Term Evolution standard, and wherein the extended broadcast information is any one of a system information block, a special SIB adapted for use by the second type of communication device, and a special physical downlink control channel adapted for use by the second type of communication device.

15. The method of claim 1, wherein the second part of the master information block includes a field encoded to indicate how the second type of communication device can obtain information that is specific to the second type of communication device.

16. The method of claim 15, wherein the field encoded to indicate how the second type of communication device can obtain information that is specific to the second type of communication device indicates in which one, out of a pre-defined set of time and frequency positions, the information that is specific to the second type of communication device is located.

17. An apparatus for operating a network node that serves a host cell in a cellular communication system, the apparatus comprising:
circuitry configured to transmit, at one or more first time intervals, first control channel information on a control channel that extends over a first bandwidth of a radiofrequency resource, wherein the first control channel communicates information that is necessary to enable a first type of communication device to establish a connection with the host cell, the first type of communication device being capable of receiving a signal having the first bandwidth of the radiofrequency resource; and
circuitry configured to transmit, at one or more second time intervals, a master information block that occupies a part of the first bandwidth of the radiofrequency resource, wherein the part of the first bandwidth of the radiofrequency resource has a second bandwidth that is smaller than the first bandwidth and is receivable by a second type of communication device having reduced receive bandwidth capabilities compared to those of the first type of communication device,
wherein the master information block comprises a first part and a second part, wherein the first part comprises first part information that is necessary to enable the first type of communication device to establish the connection with the host cell, and wherein the second part comprises second part information that directly or indirectly enables the second type of communication device to obtain parameters that enable the second type of communication device to establish a connection with the host cell.

18. The apparatus of claim 17, wherein the second part information identifies timing and/or frequency locations at which extended broadcast information will be transmitted, wherein the extended broadcast information directly or indirectly enables the second type of communication device to establish the connection with the host cell.

19. The apparatus of claim 18, wherein the extended broadcast information provides parameters that enable the second type of communication device to perform a random access procedure directed at the host cell.

20. The apparatus of claim 19, wherein the parameters that enable the second type of communication device to perform the random access procedure directed at the host cell include a random access channel sequence to be used during the random access procedure.

21. The apparatus of claim 19, wherein the parameters that enable the second type of communication device to perform the random access procedure directed at the host cell include information that identify one or more time and frequency positions at which the second type of communication device can perform the random access procedure directed at the host cell.

22. The apparatus of claim 18, wherein the extended broadcast information identifies a time and frequency position at which a special system information block (M-SIB) will be transmitted, wherein the M-SIB is a system information block that includes information that is for use by the second type of communication device.

23. The apparatus of claim 18, wherein the extended broadcast information identifies a modulation coding scheme that will be used when a special system information block (M-SIB) is transmitted, wherein the M-SIB is a system information block that includes information that is for use by the second type of communication device.

24. The apparatus of claim 18, wherein the extended broadcast information is a control channel adapted to be receivable by the second type of communication device.

25. The apparatus of claim 24, wherein the control channel adapted to be receivable by the second type of communication device includes information that enables the second type of communication device to receive a special system information block (M-SIB) that is adapted to be receivable by the second type of communication device, wherein the M-SIB is a system information block that includes information that is for use by the second type of communication device.

26. The apparatus of claim 17, wherein the second part information provides parameters that enable the second type of communication device to perform a random access procedure directed at the host cell.

27. The apparatus of claim 26, wherein the parameters that enable the second type of communication device to perform the random access procedure directed at the host cell include a random access channel sequence to be used during the random access procedure.

28. The apparatus of claim 26, wherein the parameters that enable the second type of communication device to perform the random access procedure directed at the host cell include information that identify one or more time and frequency positions at which the second type of communication device (207, 1301) can perform the random access procedure directed at the host cell.

29. The apparatus of claim 17, wherein the second part information includes a set of possible time and frequency resources and modulation and coding schemes for the second type of communication device to use in a blind decoding procedure that detects whether extended broadcast information has been transmitted.

30. The apparatus of claim 29, wherein the cellular communication system operates in accordance with a Long Term Evolution standard, and wherein the extended broadcast information is any one of a system information block, a special SIB adapted for use by the second type of communication device, and a special physical downlink control channel adapted for use by the second type of communication device.

31. The apparatus of claim 17, wherein the second part of the master information block includes a field encoded to indicate how the second type of communication device can obtain information that is specific to the second type of communication device.

32. The apparatus of claim 31, wherein the field encoded to indicate how the second type of communication device can obtain information that is specific to the second type of communication device indicates in which one, out of a pre-defined set of time and frequency positions, the information that is specific to the second type of communication device is located.

* * * * *

UNITED STATES PATENT AND TRADEMARK OFFICE
CERTIFICATE OF CORRECTION

PATENT NO. : 8,885,560 B2
APPLICATION NO. : 13/398787
DATED : November 11, 2014
INVENTOR(S) : Wallén et al.

Page 1 of 1

It is certified that error appears in the above-identified patent and that said Letters Patent is hereby corrected as shown below:

On the Title page

Item (12), under "United States Patent", in Column 1, Line 1, delete "Wallen" and insert -- Wallén --, therefor.

Item (75), under "Inventors", in Column 1, Line 1, delete "Wallen," and insert -- Wallén, --, therefor.

Item (75), under "Inventors", in Column 1, Line 2, delete "Bjarred" and insert -- Bjärred --, therefor.

Item (75), under "Inventors", in Column 1, Line 3, delete "Linkoping" and insert -- Linköping --, therefor.

Item (75), under "Inventors", in Column 1, Line 4, delete "Kavlinge" and insert -- Kävlinge --, therefor.

Item (74), under "Attorney, Agent, or Firm", in Column 2, Line 1, delete "Intelllectual" and insert -- Intellectual --, therefor.

In the Specification

In Column 1, Line 15, delete "Wilhlelmsson" and insert -- Wilhelmsson --, therefor.

In Column 2, Line 56, delete "ration" and insert -- ratio --, therefor.

In the Claims

In Column 18, Line 56, in Claim 13, delete "(207, 1301) can" and insert -- can --, therefor.

Signed and Sealed this
Fourteenth Day of July, 2015

Michelle K. Lee
*Director of the United States Patent and Trademark Office*